United States Patent
Lin

(10) Patent No.: US 6,238,125 B1
(45) Date of Patent: May 29, 2001

(54) STRUCTURE OF A JOINT FOR BRACING RODS OF A BABY STROLLER

(76) Inventor: Kao-Hsien Lin, 1F, No. 21, Lane 55, Her-Jiang St., Taipei (TW)

(*) Notice: Subject to any disclaimer, the term of this patent is extended or adjusted under 35 U.S.C. 154(b) by 0 days.

(21) Appl. No.: 09/300,600

(22) Filed: Apr. 28, 1999

(51) Int. Cl.⁷ .................................................. F16C 11/00
(52) U.S. Cl. ........................................................ 403/102
(58) Field of Search ................................. 280/642, 647, 280/650, 655, 658; 403/321, 322.1, 322.4, 324, 325, 102, 101, 107, 83, 84, 93, 96

(56) References Cited

U.S. PATENT DOCUMENTS

| | | |
|---|---|---|
| 3,115,359 | * 12/1963 | Hendrick . |
| 4,191,397 | * 3/1980 | Kassai . |
| 4,828,278 | * 5/1989 | Nakao et al. . |
| 4,993,743 | * 2/1991 | Takahasi et al. . |
| 5,244,228 | * 9/1993 | Chiu . |
| 5,645,293 | * 7/1997 | Cheng . |
| 5,722,682 | * 3/1998 | Wang . |
| 5,806,143 | * 9/1998 | Tsai . |
| 5,864,921 | * 2/1999 | Chou . |

FOREIGN PATENT DOCUMENTS

2161759 * 1/1986 (GB) ..................................... 280/650

239 367 * 9/1987 (JP) ..................................... 280/642

* cited by examiner

Primary Examiner—Lynne H. Browne
Assistant Examiner—Tomlyne Malcolm
(74) Attorney, Agent, or Firm—Bacon & Thomas, PLLC

(57) ABSTRACT

An improved joint for using on a baby stroller, being structurally provided with a twofold engagement effect, is provided. Whereby, when the baby stroller is stretched or collapsed, the joint can be in engagement and latching state without providing of additional engaging members, and reducing of cost and convenience of using can be achieved. The joint is comprised mainly of a first connecting member provided on an upper bracing rod and a second connecting member provided on a lower bracing rod. Wherein, the first connecting member is provided at the rear side thereof with a receiving chamber for receiving a pulling component. The pulling component has an engaging piece being able to extend into an upper pivotal connecting portion on the bottom of the first connecting member by means of a spring. The second connecting member is provided in a lower pivotal connecting portion on the top thereof with a first engaging groove and a second engaging groove. When the baby stroller is stretched or collapsed to be in position, the engaging piece can be automatically engaged into a corresponding engaging groove to form a latching state.

5 Claims, 7 Drawing Sheets

STRUCTURE OF A JOINT FOR BRACING RODS OF A BABY STROLLER

BACKGROUND OF THE INVENTION

1. Field of the Invention

The present invention relates to an improved joint for using on a baby stroller, the joint is provided with a twofold engagement effect. Whereby, when the baby stroller is stretched or collapsed, the joint can be in engagement and latching state without providing of additional engaging members, and reducing of cost and convenience of using can be achieved.

2. Description of the Prior Art

A conventional baby stroller mostly is structurally designed to be a collapsible frame in order for carrying and storage. Thereby, except the seat for a baby, the baby stroller is combined from a plurality of bracing rods and joints pivotally connecting the bracing rods.

As shown in FIGS. 1 and 2, a joint 300 is provided between an upper and a lower bracing rod 10, 20 to pivotally connect the bracing rods 10, 20. An additional engaging member 400 is provided above the joint 300 to keep the baby stroller in the state of engagement. The engaging member 400 simultaneously engages the bottom end of the upper bracing rod 10 and the top end of the lower bracing rod 20; thereby, engagement can be secured after stretching of the baby stroller. When the baby stroller is collapsed, it only needs to displace the engaging member 400 upwardly to release the top end of the lower bracing rod 20 for collapsing. In the same way, in order to keep the baby stroller in the state of engagement for convenience of carrying, the conventional baby stroller is provided with a hook 500 at an appropriate position. The hook 500 can control whether the baby stroller is stretched.

The above stated structure for stretching and collapsing is bothered in at least two stages of operation each time a baby stroller is stretched or collapsed. For example, when the baby stroller is stretched from a collapsed state, the hook 500 must be in the first place unlatched, then the engaging member 400 is moved up to release the top end of the lower bracing rod 20. After the baby stroller is stretched, the engaging member 400 gets back to the state in which it simultaneously engages the bottom end of the upper bracing rod 10 and the top end of the lower bracing rod 20, this is inconvenient in operation.

Besides, the joint, the engaging member 400 and the hook 500 must be manufactured separately, and then are mounted separately at suitable positions on the baby stroller. This not only results in higher cost, but also makes longer working hours for assembling baby strollers.

Therefore, if a design for the structure of a baby stroller can have the twofold engagement effect for stretching and collapsing, it is largely advantageous to convenience for a user as well as to saving of cost in manufacturing the baby stroller. The design of the present invention is exactly based on such an idea; it can get rid of the defects resided in the conventional techniques.

SUMMARY OF THE INVENTION

The baby stroller structurally provided with a twofold engagement effect of the present invention is comprised mainly of a first connecting member provided on an upper bracing rod and a second connecting member provided on a lower bracing rod. Wherein, the bottom end of the first connecting member is pivotally connected with the top end of the second connecting member. The first connecting member is provided at the rear side thereof with a receiving chamber for receiving a pulling component. The pulling component has an engaging piece being able to extend into an upper pivotal connecting portion on the bottom end of the first connecting member by means of a spring. The second connecting member is provided in a lower pivotal connecting portion on the top end thereof with a first engaging groove and a second engaging groove. When the baby stroller is stretched or collapsed to be in position, the engaging piece can be automatically engaged into a corresponding engaging groove to form a latching state.

By the structure stated above, when a user is to stretch or collapse the baby stroller, only one-stage operation is needed to make automatic engagement after stretching or collapsing. For example, when the baby stroller is stretched, the above mentioned engaging piece of the pulling component is engaged downwardly into the first engaging groove to make mutual engagement of the first connecting member and the second connecting member. At this time, if the engaging piece of the pulling component is pulled upwardly, the engagement between the first connecting member and the second connecting member can be removed. Then the first and second connecting members can be pivoted relatively to collapse the structure. When the structure is completely collapsed, the engaging piece of the pulling component is exactly aligned with the second engaging groove. By support of the spring, the engaging piece is automatically engaged into the second engaging groove to again make mutual engagement of the first connecting member and the second connecting member. Thereby, automatic engagement of the baby stroller after collapsing is completed. It can have the same effect when the baby stroller is stretched from the collapsing state. I.e., when the user releases the engaging piece from the second engaging groove to completely stretch the baby stroller, the engaging piece too automatically engaged into the first engaging groove to complete automatic engagement of the baby stroller after stretching. Thereby, the joint structure for using on a baby stroller with a twofold engagement effect of the present invention can provide large convenience when in use.

And more, by virtue that a single joint of the present invention has the twofold engagement effect for stretching and collapsing states, it can substitute the combination composed of the conventional joint, its engaging member and the hook for it. Hence cost of material and assembling work can be largely saved, and thus an object of cost reducing can be achieved.

Additionally, in order to avoid increasing bother in assembling by the pulling component provided in the joint of the present invention, design of the pulling component aims at the target of convenience for assembling. When in assembling, neither screw nor rivet is required for fixing, this is another advantage of the present invention.

The present invention will be apparent in its detailed structure after reading the detailed description of the preferred embodiment thereof in reference to the accompanying drawings.

DETAILED DESCRIPTION OF THE PREFERRED EMBODIMENT

Figure 2:
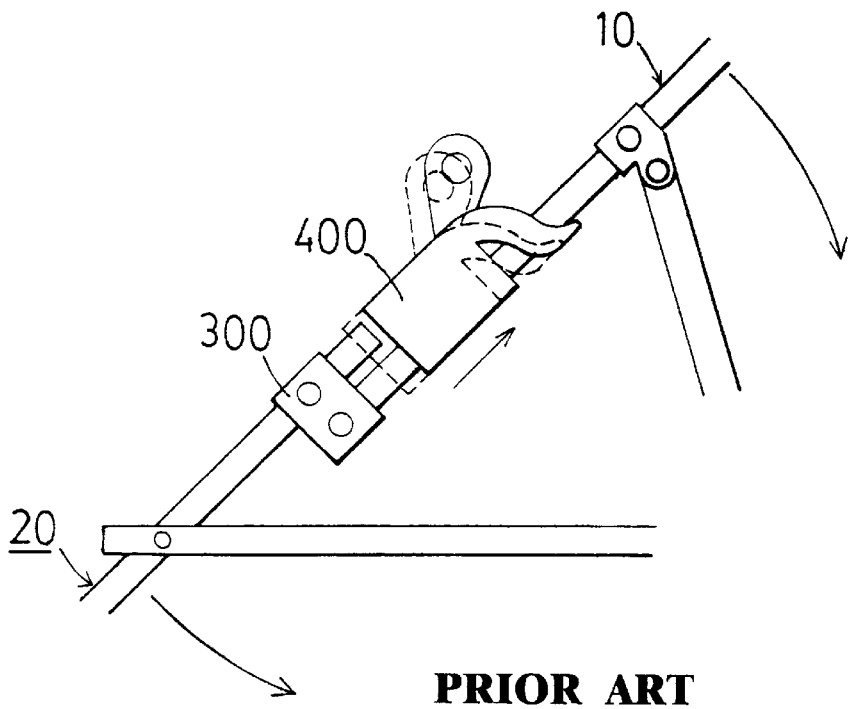
FIG. 2 is a schematic view showing operation of a joint and an engaging member of the conventional baby stroller.
Figure 1:
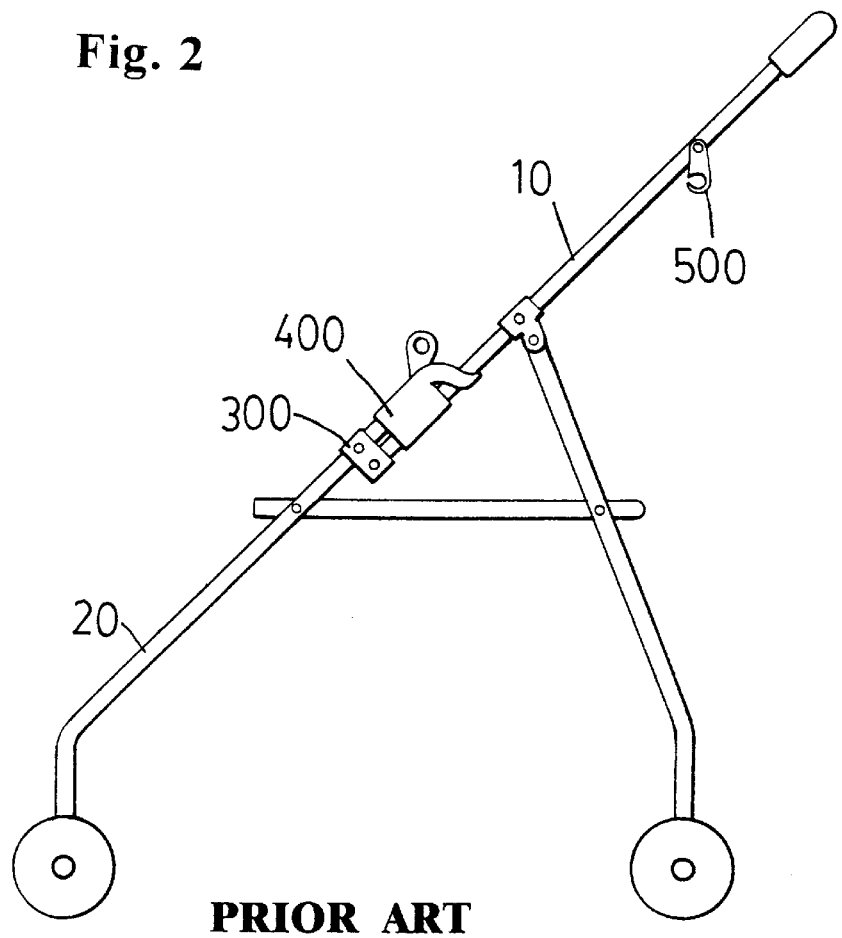
FIG. 1 is a side view showing the frame of a conventional baby stroller.
Figure 3:
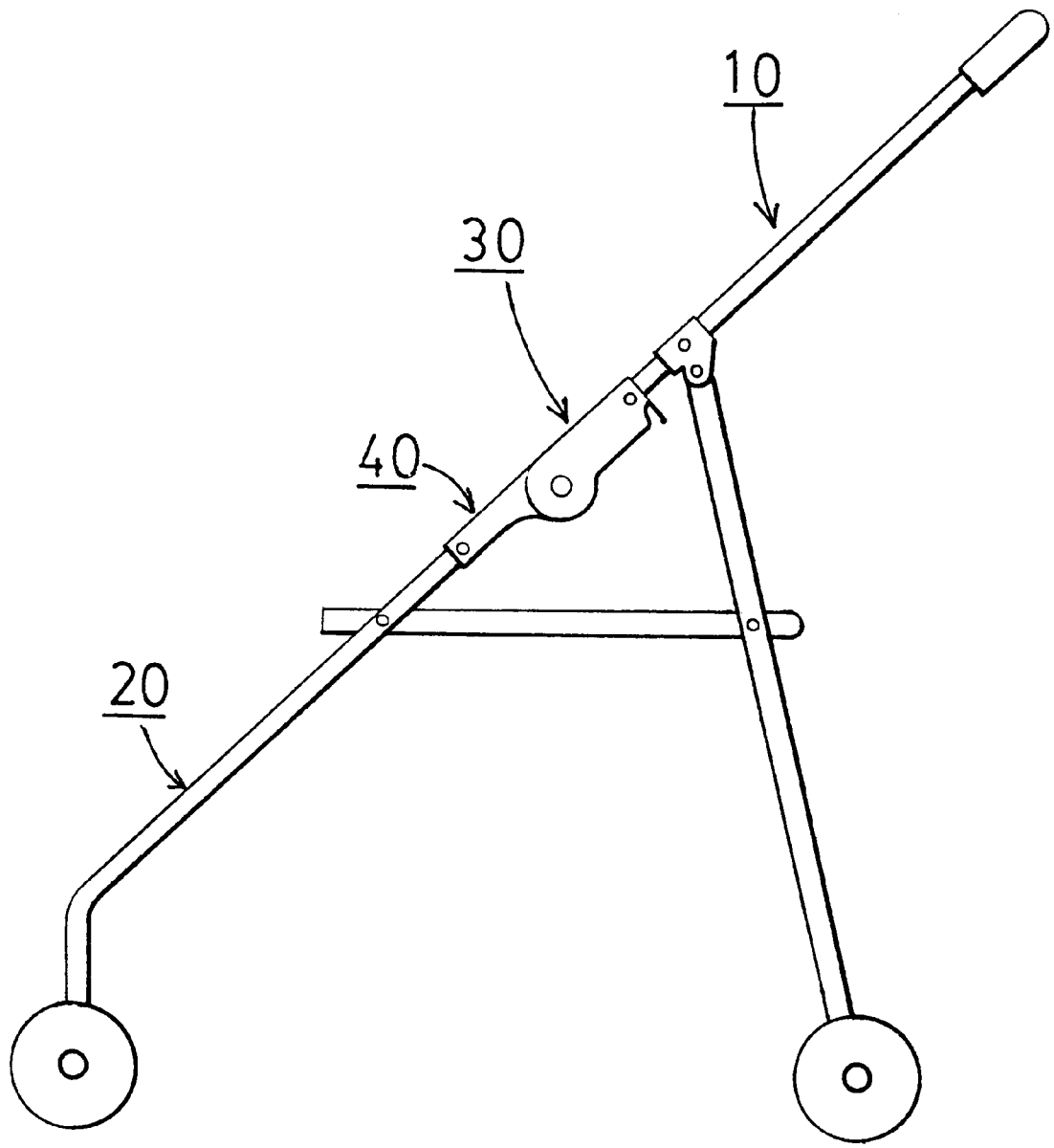
FIG. 3 is a side view showing assembling of the present invention on a baby stroller.

Referring to FIGS. 3 to 6, the joint of the present invention is provided with a twofold engagement effect and is comprised mainly of a first connecting member 30 provided on an upper bracing rod 10 and a second connecting member 40 provided on a lower bracing rod 20. Wherein, the bottom end of the first connecting member 30 is pivotally connected with the top end of the second connecting member 40. The first connecting member 30 is provided at the rear side thereof with a receiving chamber 50 for receiving a pulling component 60. The pulling component 60 has an engaging piece 61 being able to extend into an upper pivotal connecting portion 31 on the bottom end of the first connecting member 30 by means of a spring 62. The second connecting member 40 is provided in a lower pivotal connecting portion 41 on the top end thereof with a first engaging groove 42 and a second engaging groove 43. When the baby stroller is stretched or collapsed to be in position, the engaging piece 61 can be automatically engaged into a corresponding engaging groove 42 or 43 (FIGS. 7, 9) to form a latching state.

Figure 4:
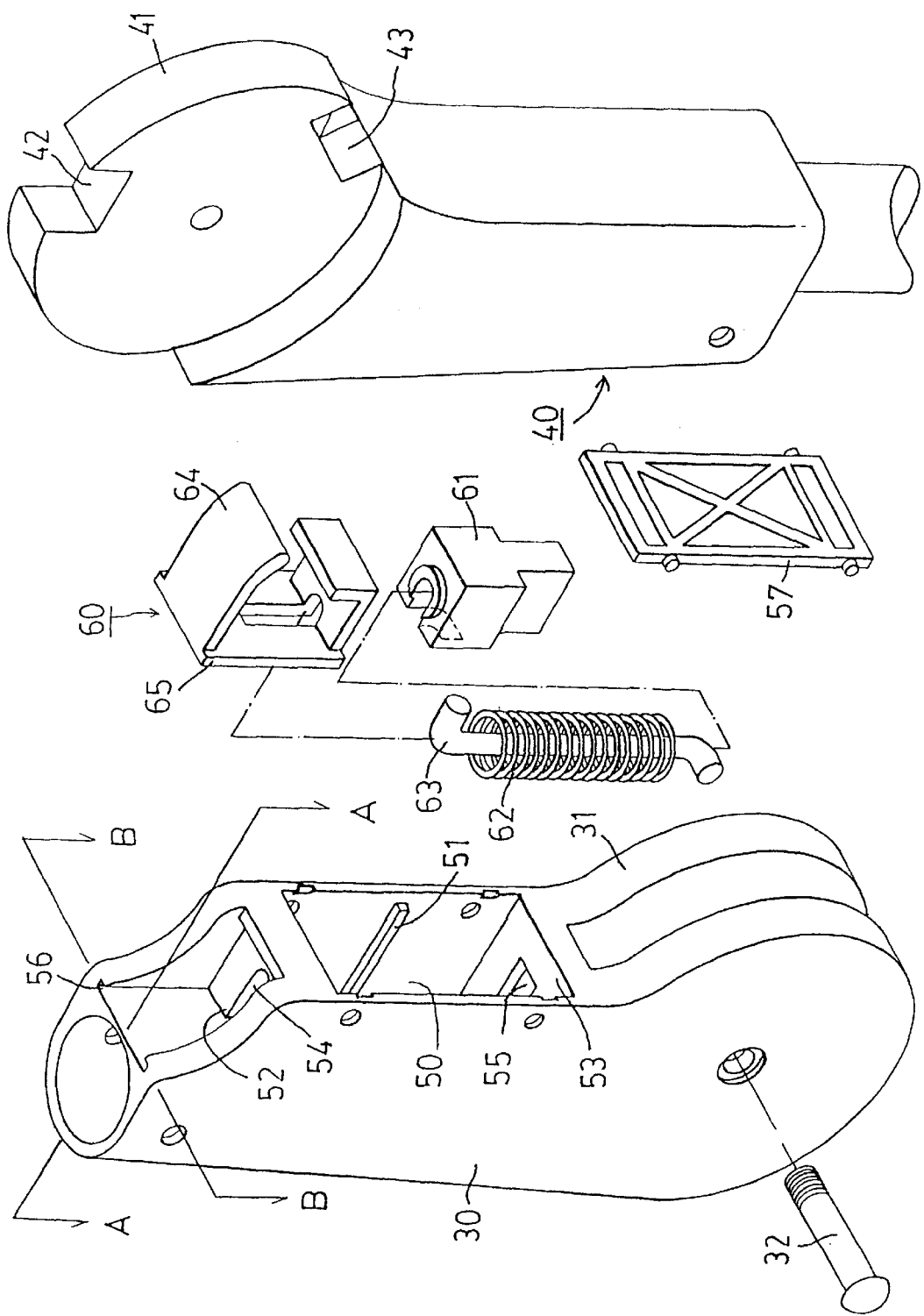
FIG. 4 is an analytic perspective view of the present invention.
Figure 8:
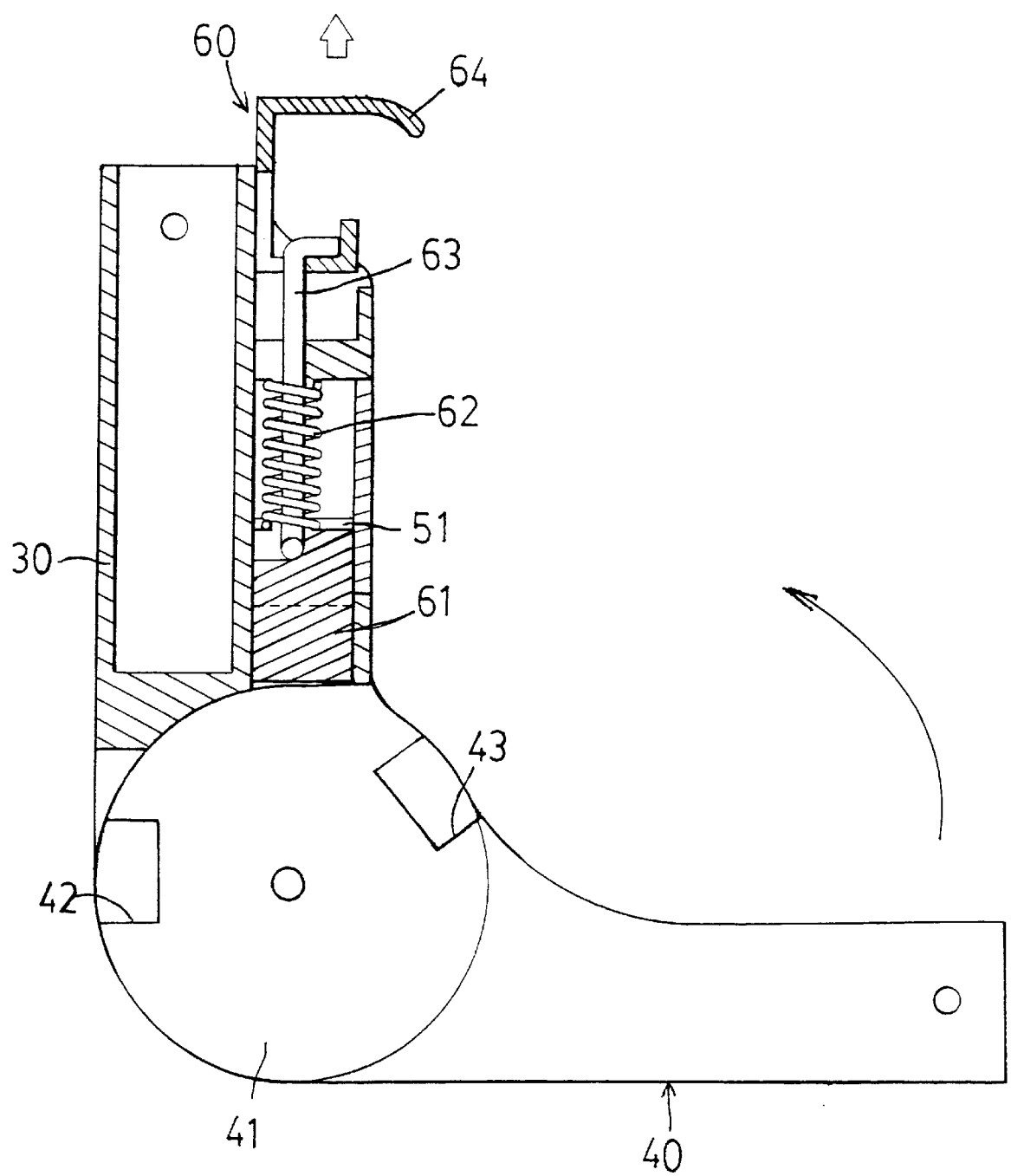
FIG. 8 is a schematic view showing relative pivoting of the first connecting member and the second connecting member, meantime showing the state of the pulling component.

Referring to FIGS. 4 and 8, the upper pivotal connecting portion 31 on the bottom end of the first connecting member 30 includes two rounded plates with a gap therebetween. The lower pivotal connecting portion 41 on the top end of the second connecting member 40 is a single rounded plate capable of fitting into the gap. The centers of the portions 31, 41 are perforated to be extended through with an axle 32 for pivotal connection, the first connecting member 30 and the second connecting member 40 can thereby pivot relative to each other.

Figure 6:
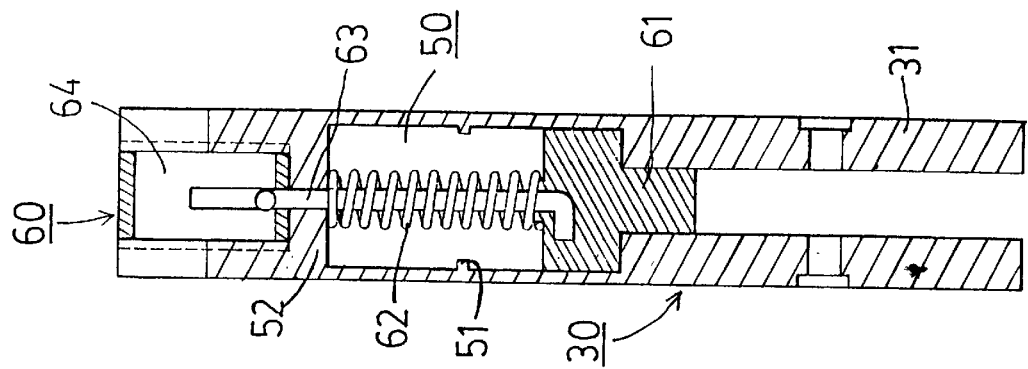
FIG. 6 is a sectional view taken from a sectional line B—B in FIG. 4, showing the first connecting member with the pulling component being provided in the receiving chamber thereof.
Figure 5:
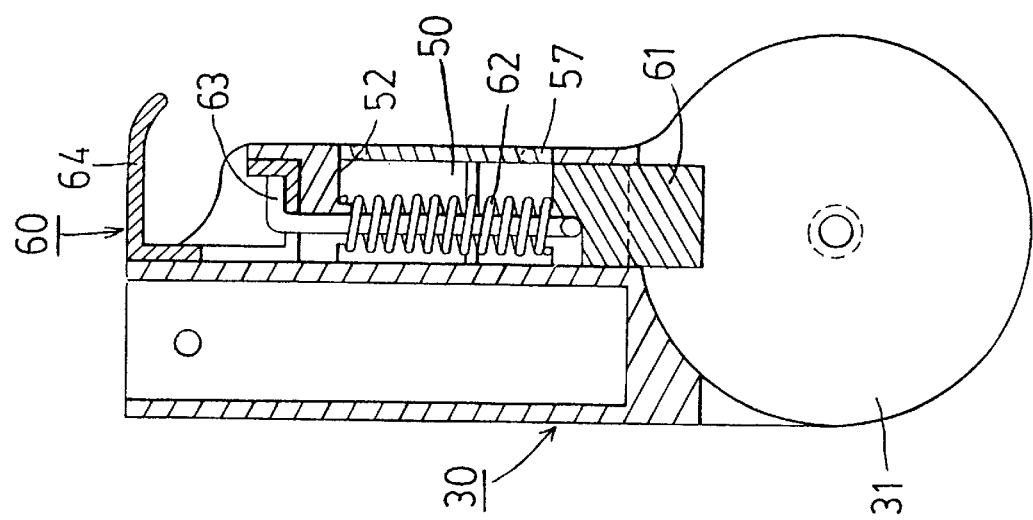
FIG. 5 is a sectional view taken from a sectional line A—A in FIG. 4, showing the first connecting member with the pulling component being provided in the receiving chamber thereof.

Referring to FIGS. 4 to 6, the above mentioned receiving chamber 50 is provided on both sides thereof with a stop flange 51; and is provided on the top and the bottom thereof respectively with an upper abutting plate 52 and a lower abutting plate 53 each being provided with a perforation 54, 55. The pulling component 60 is comprised of an engaging piece 61, a spring 62, a link 63 and a pulling lever 64. The link 63 is vertically received in the receiving chamber 50 and is slipped over with the spring 62. The top end thereof extends through the perforation 54 of the upper abutting plateS2 to be secured to the pulling lever 64; while the bottom end thereof is secured to the engaging piece 61. The bottom of the engaging piece 61 extends through the perforation 55 of the lower abutting plate 53 and to be above the lower and the upper pivotal connecting portions 41, 31. By virtue that the top end of the spring 62 abuts against the bottom of the upper abutting plate 52, while the bottom end of the spring 62 abuts against the top of the lower abutting plate 53. In this way, the spring 62 can keep the state of pressing the engaging piece 61 down. And more, the upper abutting plate 52 is provided on both sides thereof with a slide groove 56, and the pulling lever 64 is provided on both sides thereof with a protruding portion as a rail 65. By providing the slide grooves 56 and the rails 65, the pulling lever 64 is limited to mere slide-moving up and down.

The above mentioned pulling component 60 is requested to be convenient for assembling. The link 63 is bent on both ends thereof. The pulling lever 64 and the engaging piece 61 are provided with slots. Thereby, securing of the link 63, the pulling lever 64 and the engaging piece 61 can be acquired by merely extending the link 63 through the upper abutting plate 52 to get into the receiving chamber 50 and bending the two ends of the link 63 to engage them into the slots of the pulling lever 64 and the engaging piece 61 respectively. Additionally, a cover 57 having tenons is added, while the receiving chamber 50 is provided on both sides thereof with mortises. The cover 57 is forcedly pressed and engaged with the joint at the opening of the receiving chamber 50.

Thereby, the spring 62, the link 63 and the pulling lever 64 can be hidden in the receiving chamber 50, such assembling is convenient. And an assembly as shown in FIGS. 5 and 6 is completed.

Figure 7:
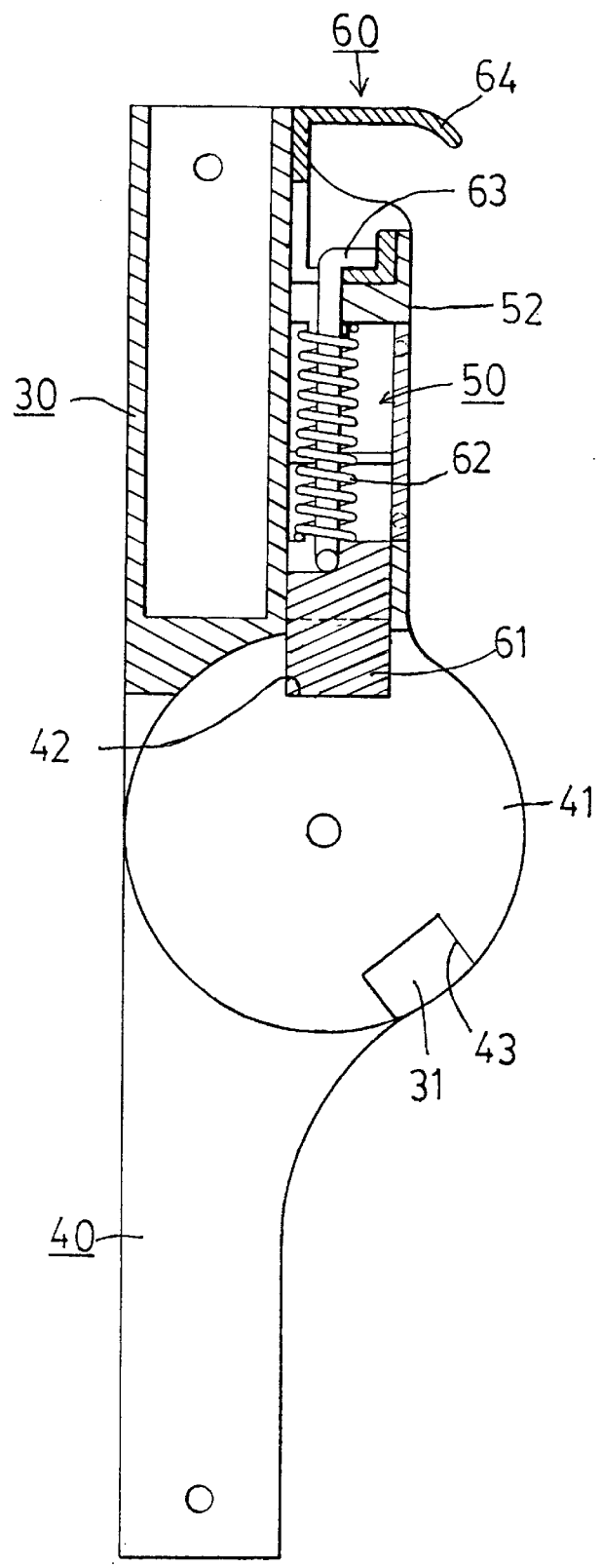
FIG. 7 is a schematic view showing assembling of the first connecting member and the second connecting member; meantime showing the pulling component is engaged into the first engaging groove.

As shown in FIG. 7, when the baby stroller is stretched, the engaging piece 61 of the pulling component 60 is pressed by the spring 62, while the lower end thereof is extended down into the first engaging groove 42 of the lower pivotal connecting portion 41 on the second connecting member 40. So that the first connecting member 30 is engaged with the second connecting member 40 and the baby stroller is kept in the stretched state and can not be collapsed now.

As shown in FIG. 8, when a user exerts force upwardly on the pulling lever 64 of the pulling component 60, while the receiving chamber 50 is provided on both sides thereof with stop flange 51, the pulling lever 64 can be prevented from dropping due to overly upward pulling. The pulling lever 64 can carry the engaging piece 61 to move it up by connection with the link 63 to thereby release the engaging piece 61 from the first engaging groove 42, and the engagement between the first connecting member 30 and the second connecting member 40 is removed. Then the first connecting member 30 and the second connecting member 40 can pivot relatively to each other for collapsing. When they arc pivoting relatively, the user needs not to exert force on the pulling component 60 all the way upwardly, since the engaging piece 61 has been get rid of the first engaging groove 42.

Figure 9:
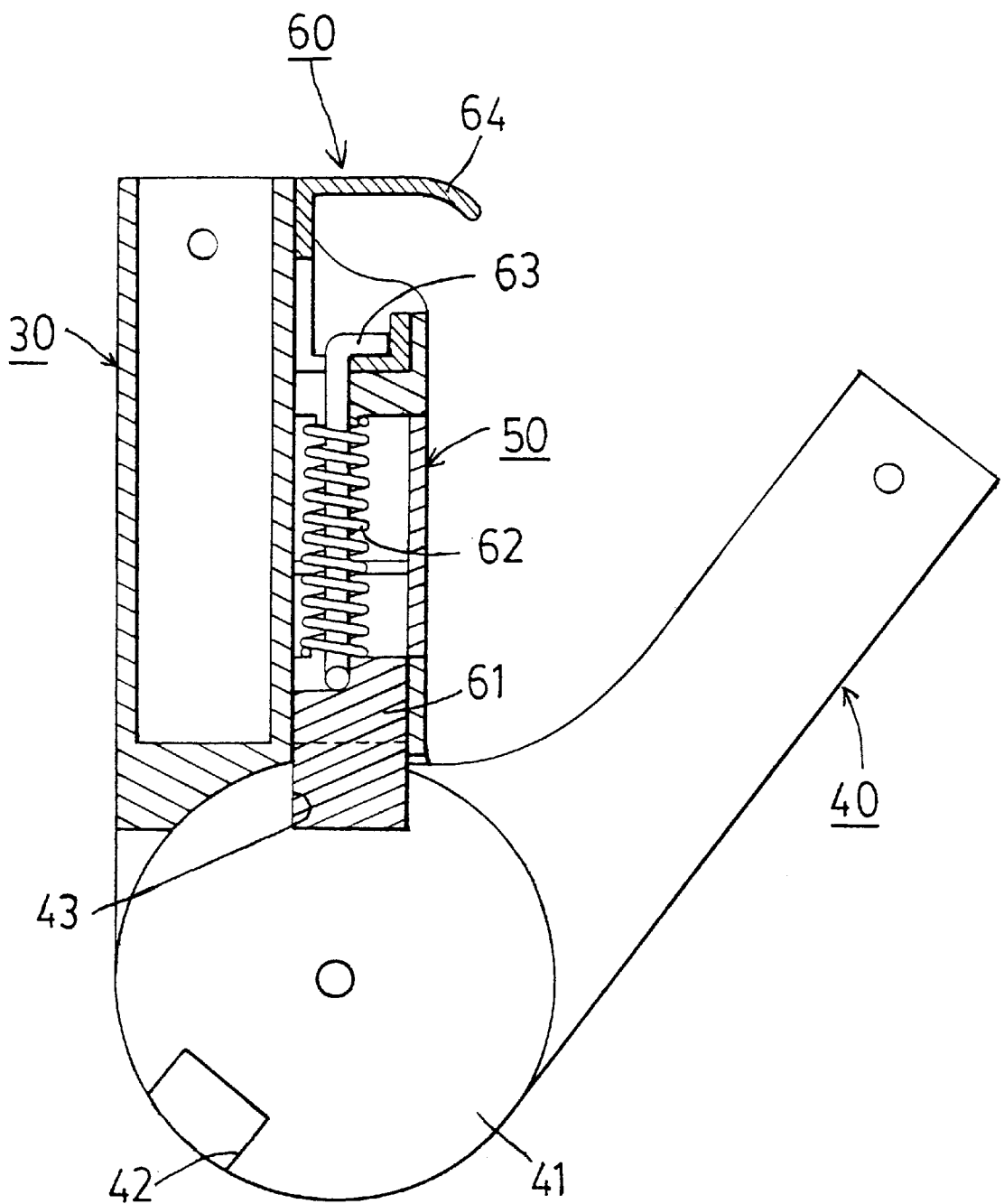
FIG. 9 is a schematic view showing assembling of the first connecting member and the second connecting member; meantime showing the pulling component is engaged into the second engaging groove.

As shown in FIG. 9, when the baby stroller is completely collapsed, the lower pivotal connecting portion 41 of the second connecting member 40 is pivoted exactly to the position where the engaging piece 61 of the pulling component 60 is aligned with the second engaging groove 43. By virtue that the spring 62 always keeps its action of pressing down, the engaging piece 61 can engage into the second engaging groove 43 automatically to render the engagement between the first connecting member 30 and the second connecting member 40 to establish again. Thereby, automatic engagement after collapsing of the baby stroller can be accomplished.

Similarly, when the user wants to stretch the baby stroller, it can be proceeded only by releasing the engaging piece 61 from the second engaging groove 43. When the baby stroller is completely stretched, the engaging piece 61 engages into (FIG. 7) the first engaging groove 42 automatically and thus accomplishes the automatic engagement after stretching of the baby stroller. In other words, when the user wants to stretch or collapse the baby stroller, only one stage of operation is required to acquire the automatic engagement after stretching or collapsing of the baby stroller. This provides quite large convenience in use.

The names of the members composing the present invention and the embodiment shown in the drawings are only for illustrating the structure of the present invention, and not for giving any limitation to the scope of the present invention. It will be apparent to those skilled in this art that various modifications or changes can be made to the elements of the present invention without departing from the spirit, scope and characteristic of this invention. Accordingly, all such modifications and changes also fall within the scope of the appended claims and are intended to form part of this invention.

What is claimed is:

1. A joint for a baby stroller having an upper bracing rod and a lower bracing rod to permit the rods to be placed into twofold extended and collapsed positions, the joint comprising:

a) a first connecting member for attachment to a lower end of an upper bracing rod and a second connecting member for attachment to an upper end of a lower bracing rod;

b) the first connecting member including a receiving chamber and a bottom end defined by two rounded plates with a gap therebetween;

c) the second connecting member including a top end defined by a single rounded plate, the single rounded plate being disposed within the gap of the bottom end of the first connecting member, the single rounded plate having first and second engaging grooves formed therein, the two rounded plates of the first connecting member and the single rounded plate of the second connecting member being centrally perforated therethrough, and an axle extending through the perforations to permit the first and second connecting members to pivot relative to each other between an extended position and a collapsed position; and d) a pulling component disposed within the receiving chamber of the first connecting member, the pulling component including an engaging piece, a spring urging the engaging piece into selective engagement within the first and second engaging grooves to maintain the first and second connecting members in the respective extended and collapsed positions.

2. The joint for a baby stroller of claim 1 wherein:

a) the receiving chamber further includes a stop flange provided on an inner wall thereof, an upper abutting plate and a lower abutting plate, the abutting plates each having a perforation formed therein;

b) the pulling component further includes a link disposed within the receiving chamber and a pulling lever, the link extending through the spring and including a top end and a bottom end, the top end of the link extending through the perforation of the upper abutting plate and the lower end being secured to the engaging piece, the engaging piece extending through the perforation of the lower abutting plate; and c) a top end of the spring abutting against a bottom of the upper abutting plate and a bottom end of the spring abutting against a top of the lower abutting plate, thereby permitting the spring to urge the engaging piece towards either engaging groove of the single rounded plate.

3. The joint for a baby stroller of claim 2 wherein the upper abutting plate is provided with an adjacent slide groove and the pulling lever includes a rail slidably engaged within the slide groove to permit the pulling lever to move up and down with respect to the upper abutting plate.

4. The joint for a baby stroller of claim 2, further including a cover having a plurality of tenons, the receiving chamber being provided on a pair of opposed sides with a plurality of mortises, the tenons being engagable within the mortises to permit the cover to conceal the interior of the receiving chamber.

5. The joint for a baby stroller of claim 2 wherein each of the top and bottom ends of the link is bent, the pulling lever and the engaging piece are each provided with a slot, the bent top end of the link is engaged within the slot of the pulling lever and the bent bottom end of the link is engaged within the slot of the engaging piece.

* * * * *